W. H. BECKETT.
Stop-Cock.
No. 159,746
Patented Feb. 16, 1875.
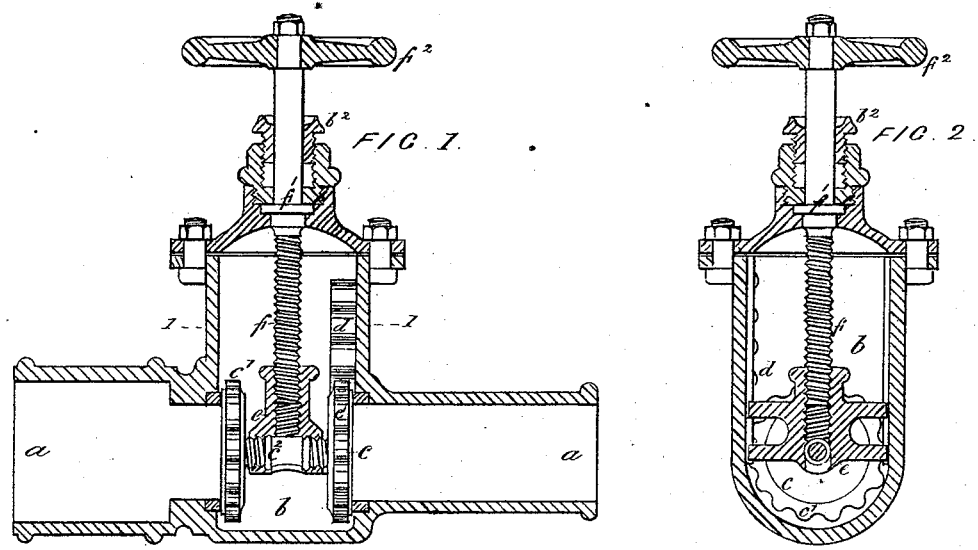
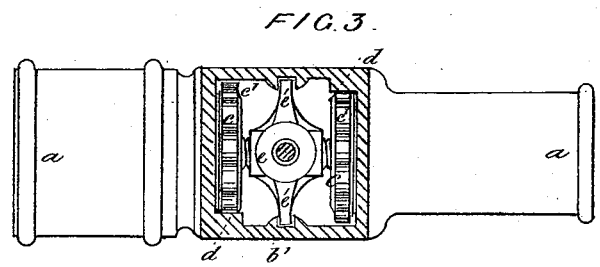
Witnesses
William Brookes
Alfred George Brookes
Inventor
William Henry Beckett
THE GRAPHIC CO.PHOTO-LITH.39 & 41 PARK PLACE,N.Y.

UNITED STATES PATENT OFFICE.

WILLIAM H. BECKETT, OF CHELMSFORD, ENGLAND.

IMPROVEMENT IN STOP-COCKS.

Specification forming part of Letters Patent No. 159,746, dated February 16, 1875; application filed July 7, 1874.

*To all whom it may concern:*

Be it known that I, WILLIAM HENRY BECKETT, of Chelmsford, England, engineer, have invented an Improvement in Stop-Cocks, of which the following is a specification:

The invention relates to the use of metal disks or valve-plates, and to the means by which motion is given to them for opening or closing the valve-passages, so as to secure complete fitting of the valve-plates to their seats for closing the passages, and yet admit of a free passage for the fluid when desired.

But that the invention may be fully understood, I will, by the aid of the accompanying drawings, proceed to describe means pursued by me in carrying the same into effect.

Figure 1 shows a longitudinal section, and Fig. 2 a transverse section, of apparatus arranged according to my invention. Fig. 3 is a sectional plan of the same, taken through the line 1 1 of Fig. 1.

In each of the figures the same letters indicate corresponding parts.

$a\ a$ indicate the barrel of the valve apparatus by which connection is made with the pipes of supply and delivery. $b$ is the valve-chamber, and $c\ c$ are the two valves or valve-plates. The edge of each of these valves or valve-plates is formed with cogs or teeth $c^1$, which are formed to take into corresponding cogs or teeth in racks $d\ d$, of which there is one to each valve or valve-plate; but they are applied at opposite sides of the valve-chamber $b$. Each valve or valve-plate is also provided with a stem, $c^2$, with a thread thereon, adapted to take into a corresponding female screw formed in the lower part of the socket $e$. This socket $e$ is also tapped transversely to receive the screw-thread of the stem $f$, by which the socket $e$, together with the valves or valve-plates $c\ c$, may be raised or lowered. The socket $e$ is formed with, or has applied to it, projections or horns $e'\ e'$, to move vertically in grooves or between guide-plates $b^1\ b^1$, formed in or applied to the interior of the valve-chamber $b$. The upper part of the spindle or stem $f$ is formed with a collar, $f^1$, to turn in the recess formed for it under the stuffing-box $b^2$, through which the stem $f$ rises, and is thereby made fluid-tight. The stem $f$ then has applied to it a wheel, $f^2$, or other suitable handle, by which it may be freely turned.

Upon turning the spindle $f$ in one direction the socket $e$, with the valves $c\ c$, will be raised, and in this rising of the valves or valve-plates $c\ c$ they will be caused to turn by their teeth $c^1$ taking into the teeth of the racks $d$, and in so rising they will, by the turning of their spindles $c^2$ in the socket $e$, be drawn away from their valve-seats, thus freeing them; then, on turning the spindle $f$ in the opposite direction, the valves will be caused to rotate, or partially rotate, in the opposite direction, when the action of these threaded spindles $c^1$ in the socket $e$ will be to cause them, in their descent again, to close firmly on the valve-seats.

It will be observed that a very important advantage, arising out of this rotary motion being given to the valves in their closing, is that the valve-seats, as well as the surfaces of the valves brought in contact with them, are scraped and cleansed in the act of, or before, final closing.

Having thus described my invention, and the means by which I carry the same into effect, what I claim, and desire to secure by Letters Patent, is—

The combination of the toothed valves $c\ c^1\ c^2$, racks $d$, socket $e\ e'$, and screw-spindle $f$, substantially as and for the purpose set forth.

In testimony whereof I have signed my name to this specification in the presence of two subscribing witnesses.

W. H. BECKETT.

Witnesses:
JAMES G. NAYLOR,
W. FOLKES.